United States Patent [19]
Bacskai

[11] 3,720,637
[45] March 13, 1973

[54] OLEFIN-MALEIC ANHYDRIDE CROSSLINKED TERPOLYMERS

[75] Inventor: Robert Bacskai, Kensington, Calif.

[73] Assignee: Chevron Research Company, San Francisco, Calif.

[22] Filed: March 29, 1971

[21] Appl. No.: 129,222

[52] U.S. Cl...260/29.7 H, 260/29.7 T, 260/78.5 HC, 260/78.5 R, 260/78.5 T, 260/80.73, 260/80.8
[51] Int. Cl..............................................C08f 19/20
[58] Field of Search...260/29.6 T, 29.6 TA, 78.5 HC, 260/78.5 R, 78.5 T, 80.73, 29.7 H, 29.7 T

[56] References Cited
UNITED STATES PATENTS

| | | | |
|---|---|---|---|
| 2,725,367 | 11/1955 | Niederhauser | 260/78.5 HC |
| 3,073,806 | 1/1963 | Reinhard | 260/78.5 HC |
| 3,393,168 | 7/1968 | Johnson | 260/29.6 TA |
| 3,409,578 | 11/1968 | Hwa | 260/29.6 TA |

*Primary Examiner*—William H. Short
*Assistant Examiner*—L M. Phynes
*Attorney*—G. F. Magdeburger, John Stoner, Jr. and J. A. Buchanan, Jr.

[57] ABSTRACT

Crosslinked terpolymers of isobutene-maleic anhydride and divinylbenzene and their alkali metal, amide ammonium, amide amine, ammonium and amine salts and aqueous dispersions thereof.

5 Claims, No Drawings

OLEFIN-MALEIC ANHYDRIDE CROSSLINKED TERPOLYMERS

BACKGROUND OF THE INVENTION

This invention relates to novel crosslinked olefin-maleic anhydride terpolymers. More particularly, the invention is concerned with crosslinked isobutene-maleic anhydride-divinylbenzene terpolymers and their alkali metal, amide, ammonium, and amine salts and aqueous dispersions containing them.

Crosslinked polymers are a well known class of compounds. They are useful as coatings, adhesives, dispersants, paper sizing agents, and also as thickeners for latexes and aqueous media. In the preparation of such crosslinked polymers divinylbenzene has been recognized as an excellent crosslinking agent for styrene-maleic anhydride polymers. However, the preparation of divinylbenzene crosslinked polymers of $C_2$–$C_4$ olefins and maleic anhydride has not been successful heretofore. As a result the relatively expensive $\alpha,\omega$-dienes and allyl methacrylates have been proposed as crosslinking agents for olefin-maleic anhydride terpolymers.

SUMMARY OF THE INVENTION

In accordance with the present invention novel crosslinked terpolymers are provided consisting essentially of substantially equimolar proportions of isobutene and maleic anhydride with divinyl-benzene in proportions in the range of from about 0.1 mol percent to about 5 mol percent of the terpolymer, and the alkali metal, amide-ammonium, amide-amine, ammonium and amine salts and aqueous compositions containing them.

The isobutene, maleic anhydride and divinylbenzene terpolymer of this invention is definitely crosslinked. The addition of divinylbenzene to the isobutene-maleic anhydride polymer system gives a viscosity increase as high as three orders of magnitude or more, and the resulting terpolymer possesses desirable thickening and gel forming properties as shown by insolubility in dimethyl formamide, a typical solvent for the determination of such characteristics. On the other hand, the viscosities of the corresponding ethylene-maleic anhydride and propylene-maleic anhydride polymer systems are not significantly affected by the addition of divinylbenzene, and the products are soluble in dimethyl formamide indicative of their poor thickening and gel forming ability.

The novel crosslinked isobutene-maleic anhydride-divinyl-benzene terpolymers and their salts in accordance with the invention give useful aqueous dispersions comprising a major proportion of water and a minor proportion sufficient to thicken water of said crosslinked terpolymer as illustrated by latex formulations used as adhesives for carpet backings.

DESCRIPTION OF THE PREFERRED EMBODIMENTS

The crosslinked isobutene-maleic anhydride-divinylbenzene terpolymers of the present invention are prepared in the usual manner of addition polymers. The three monomers are charged to a polymerization zone. A free radical initiator is preferably employed such as benzoyl peroxide, di-tertiary-butyl peroxide, azobisisobutyro-nitrile and the like. It is also desirable to carry out the addition polymerization in an inert organic solvent to facilitate the reaction and product workup. Suitable solvents include ethylene dichloride, dioxane, and hydrocarbons such as benzene, toluene, and xylene.

The novel crosslinked ternary copolymers of the invention are prepared by a reaction which may be formulated as follows:

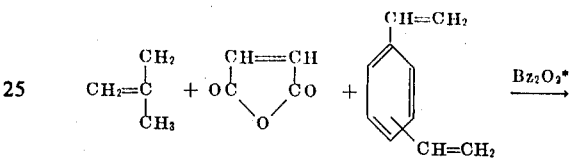

\* Benzoyl peroxide

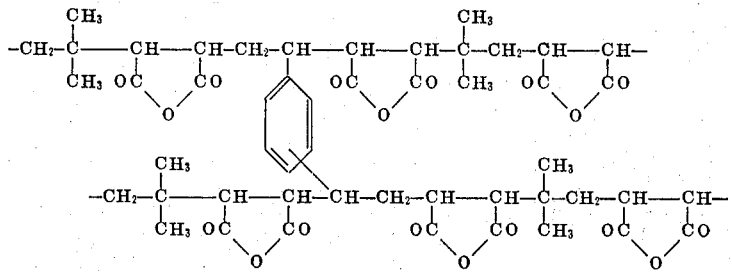

In the above reaction the olefin components, either isobutene or divinylbenzene, alternate with the maleic anhydride. The isobutene is usually present in a molar excess with regard to maleic anhydride of as high as 4:1 although the interpolymer is formed from a substantially 1:1 equimolar ratio of isobutene and maleic anhydride. Excess isobutene is readily separated in gaseous form following the reaction. The divinylbenzene is used in amounts sufficient to make the isobutene-maleic anhydride-divinylbenzene terpolymer substantially insoluble in a known solvent such as dimethyl formamide. Preferred proportions are in the range of from about 0.1 mol percent to about 5 mol percent divinylbenzene.

The alkali metal, amide-ammonium, amide-amine, ammonia, and amine salts of the isobutene-maleic anhydride-divinyl benzene crosslinked terpolymers in accordance with the invention are prepared by reaction of the terpolymer with a base such as the alkali metal hydroxides (lithium, sodium, potassium, etc.), ammonium hydroxide, amines (lower alkyl primary and secondary amines—for example, methylamine, ethylamine, propylamine, dimethylamine, methylethylamine, etc.) and the like. The mixed amide-ammonia and amide-amine salts of the terpolymers are formed by reaction with the anhydrides, whereas salts are formed by hydrolyzing the anhydrides to the carboxylic acid form prior to or simultaneously with neutralization.

The molecular weight of crosslinked polymers themselves cannot be definitely measured. However, the copolymers of maleic anhydride and isobutene were made under the same conditions as used to prepare the terpolymers of this invention and were found to have specific viscosities in the range of 0.1 to 3.0 (measured on 0.1 gram in 100 ml. of dimethylformamide at 25° C). Viscosities of this magnitude correspond to copolymer molecular weights within the range of about 10,000 to 1,000,000. The terpolymers are reasonably estimated to have molecular weights at least twice and ordinarily several times these values. That is, the molecular weights of the cross-linked terpolymers of this invention are at least about 20,000, ordinarily at least about 200,000, and go up to about as high as 20,000,000.

The following table of compounds is illustrative of various terpolymers by way of their derivatives in accordance with the invention.

| Terpolymer Derivative* | Molar Proportions |
|---|---|
| disodium | 0.99:1:0.01 |
| dipotassium | 0.95:1:0.05 |
| dilithium | 0.97:1:0.03 |
| dirubidium | 0.995:1:0.005 |
| methylamide-methylamine | 0.96:1:0.04 |
| dimethylamide-dimethylamine | 0.98:1:0.02 |
| ethylamide-ethylamine | 0.95:1:0.05 |
| ethanolamide-ethanolamine | 0.95:1:0.05 |
| isopropanolamide-isopropanolamine | 0.97:1:0.03 |
| piperidineamide-piperidinium | 0.99:1:0.01 |
| morpholineamide-morpholinium | 0.98:1:0.02 |
| methylethylamide-methylethylamine | 0.995:1:0.005 |
| diammonium | 0.99:1:0.01 |
| bis(dimethylamine) | 0.98:1:0.02 |
| bis(monomethylamine) | 0.97:1:0.03 |
| bis(diethanolamine) | 0.96:1:0.04 |

*Named per unit of maleic anhydride, although all are poly salts of isobutene-maleic anhydride-divinylbenzene terpolymers having the molar ratio given in Column 2.

As mentioned, the terpolymers according to the invention are effective as thickeners for aqueous compositions. They are employed in proportions sufficient to thicken the water or aqueous dispersion, usually in amounts of from about 0.1 percent by weight to about 10 percent by weight for practical applications.

The following examples are further illustrative of the novel polymers of this invention. Unless otherwise specified, the proportions in the illustrative examples are on a weight basis.

Example 1 — Divinylbenzene Crosslinked Isobutene-Maleic Anhydride Copolymer

The maleic anhydride used in the reaction was purified by dissolving in benzene, filtering out the insoluble particles, and evaporating the benzene in vacuum. A 1-liter stainless steel autoclave was charged with 25 g. (0.255 mole) purified maleic anhydride, 460 ml. benzene, 1 ml. (0.007 mole) freshly distilled divinylbenzene, and 0.8 g. benzoylperoxide. The autoclave was purged with nitrogen; and under stirring it was pressurized with full isobutene cylinder pressure for 5 minutes. The reaction mixture was heated to 70° C and stirred for four hours. During the reaction the maximum pressure in the autoclave was 60 psi. After cooling down, the polymer consisting of fine particles was collected on a filter, washed with ether, and dried in vacuum at 70° C. Yield: 38.1 g. (96.9 percent of theory). Analysis; calculated for the alternating isobutene-maleic anhydride copolymer: C, 62.33 percent; H, 6.54 percent. Found: C, 62.14 percent; H, 6.57 percent.

Example 2 — Crosslinked Isobutene-Maleic Anhydride Copolymer Amide-Ammonium Salt A 20-gram portion of the above-described polymer was suspended in 200 ml. benzene. The suspension was stirred and $NH_3$ gas bubbled through it for 30 minutes. The reaction was slightly exothermic and the temperature rose to 40° C. The solid reaction product was filtered, washed with pentane, and dried at room temperature in vacuum. Yield: 25.0 g. (102 percent of theory). Analysis; calculated for the amide-ammonium salt of the alternating isobutene-maleic anhydride copolymer: N = 14.87 percent. Found: 9.95 percent.

In further experimental examples the preparation of polymers of ethylene-maleic anhydride-divinylbenzene and polymers of propylene-maleic anhydride-divinylbenzene was attempted for comparison. It was found that the viscosity of the ethylene and propylene copolymers is not significantly affected by the addition of divinylbenzene. Also the ethylene and propylene copolymers were substantially soluble in amounts of approximately 10 percent by weight in dimethyl formamide at 25° C and formed a clear solution. In contrast, the isobutene-maleic anhydride-divinylbenzene crosslinked terpolymers of the invention were insoluble and gave a thixotropic gel.

The effect of divinylbenzene addition in the isobutene-maleic anhydride copolymerization carried out in Example 1 and in accordance with the present invention was further illustrated in a number of experiments. The essential details of the experiments are set out in Table I below.

TABLE I

| Ex. No. | Divinyl-benzene, ml. | copolymer yield g. | Copolymer solubility in dimethyl formamide[a] | Salt yield,[b] g. | viscosity,[c] cps 60 rpm | 0.3 rpm |
|---|---|---|---|---|---|---|
| 3 | 0 | 37.0 | soluble | 23.7 | 30 | 60 |
| 4 | 0.3 | 36.7 | insoluble Gel | 25.0 | 1128 | 36,800 |
| 5 | 0.5 | 38.0 | insoluble Gel | 25.9 | 1580 | 62,000 |
| 6 | 1.0 | 38.1 | insoluble Gel | 25.0 | 3740 | 90,000 |
| 7 | 2.0 | 37.9 | insoluble Gel | 25.6 | 610 | 30,800 |

[a] 0.1 g. copolymer in 1 ml. Dimethyl Formamide
[b] From 20 g. copolymer
[c] 0.3 percent solution in water, after 15 minutes of stirring, measured by a Brookfield LVT Viscometer at 25° C.

The above experiments show that the isobutene-maleic anhydride-divinylbenzene terpolymers are crosslinked according to the generally accepted dimethyl formamide solubility test. Also it is seen that remarkable thickening of aqueous dispersions is obtained by the use of the terpolymers.

The usefulness of the crosslinked isobutene-maleic anhydride-divinylbenzene terpolymers as thickening agents was demonstrated in latex formulations used as adhesives for carpet backings. The thickening agent was added to the latex to increase its viscosity in order to prevent dripping during the glueing operation. In the experiments the amide ammonium salt prepared in accordance with the procedure of Example 2 was used. The latex was a commercially available carboxylated styrene-butadiene copolymer composition produced by Dow Chemical Company, and the antifoam additive was also a commercial material of Dow Chemical Company made for this purpose. The results of these experiments are set out in Table II below.

TABLE II

| Formulation Composition | Thickener, % | Viscosity,* cps 60 rpm | 0.3 rpm |
|---|---|---|---|
| 208 g. Latex<br>119 g. H$_2$O<br>2 drops Antifoam B<br>275 g. Marble White (CaCO$_3$) | 0 | 52 | — |
| 208 g. Latex<br>2 drops Antifoam B<br>275 g. Marble White (CaCO$_3$)<br>120 g. Isobutene-maleic anhydride-divinylbenzene** (1% solution) | 0.2 | 450 | 11,000 |
| 208 g. Latex<br>2 drops Antifoam B<br>275 g. Marble White (CaCO$_3$)<br>120 g. Isobutene-maleic anhydride-divinylbenzene** (1.64% solution) | 0.33 | 1880 | 102,000 |

*Measured as in Table I.
**An amide-ammonium salt having a viscosity of 63,000 cps (0.3 rpm) in a 0.3% solution after 15 minutes of stirring.

The above test results show that the water-soluble salts of crosslinked isobutene-maleic anhydride-divinylbenzene terpolymer of the invention are effective as thickeners for typical latex compositions.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

I claim:

1. Crosslinked terpolymers of substantially equimolar portions of isobutene and maleic anhydride with divinylbenzene in a proportion in the range of from about 0.1 mol percent to about 5 mol percent of the terpolymer and the amide-ammonium salts thereof, said terpolymers being substantially insoluble in dimethyl formamide.

2. The crosslinked terpolymers of isobutene, maleic anhydride and divinylbenzene of claim 1.

3. The amide-ammonium salts of crosslinked terpolymers of claim 2.

4. An aqueous dispersion consisting essentially of a major proportion of water and a minor proportion sufficient to thicken said water of a compound of claim 1 dispersed therein.

5. An aqueous dispersion consisting essentially of a major proportion of water and a minor proportion sufficient to thicken said water of an amide-ammonium salt of crosslinked terpolymer of isobutene, maleic anhydride and divinyl-benzene in accordance with claim 3.

* * * * *